US010781865B2

(12) United States Patent
Isobe et al.

(10) Patent No.: US 10,781,865 B2
(45) Date of Patent: Sep. 22, 2020

(54) POWER TRANSMITTING APPARATUS

(71) Applicant: Kabushiki Kaisha F.C.C., Hamamatsu-shi (JP)

(72) Inventors: Kenichiro Isobe, Hamamatsu (JP); Junichi Nishikawa, Hamamatsu (JP); Naoki Kishimoto, Hamamatsu (JP); Yuki Kobayashi, Hamamatsu (JP)

(73) Assignee: Kabushiki Kaisha F.C.C., Hamamatsu-shi (JP)

( * ) Notice: Subject to any disclaimer, the term of this patent is extended or adjusted under 35 U.S.C. 154(b) by 5 days.

(21) Appl. No.: 16/044,573

(22) Filed: Jul. 25, 2018

(65) Prior Publication Data

US 2019/0017554 A1 Jan. 17, 2019

Related U.S. Application Data

(63) Continuation of application No. PCT/JP2017/002564, filed on Jan. 25, 2017.

(30) Foreign Application Priority Data

Jan. 25, 2016 (JP) ................................. 2016-011589

(51) Int. Cl.
*F16D 13/56* (2006.01)
*F16D 13/04* (2006.01)
*F16D 13/54* (2006.01)

(52) U.S. Cl.
CPC ............. *F16D 13/56* (2013.01); *F16D 13/04* (2013.01); *F16D 13/54* (2013.01); *F16D 2013/565* (2013.01)

(58) Field of Classification Search
CPC .......... F16D 13/04; F16D 13/52; F16D 13/54; F16D 13/56; F16D 2013/565; F16D 43/216
See application file for complete search history.

(56) References Cited

U.S. PATENT DOCUMENTS

| 2008/0308382 A1* | 12/2008 | Kataoka | ................. F16D 13/56 192/93 R |
| 2014/0326570 A1 | 11/2014 | Isobe et al. | |
| 2015/0292567 A1 | 10/2015 | Kishimoto et al. | |

FOREIGN PATENT DOCUMENTS

| JP | 22-485 Y1 | 4/1947 |
| JP | 2005-325993 A | 11/2005 |

(Continued)

OTHER PUBLICATIONS

International Search Report dated Apr. 25, 2017.

*Primary Examiner* — Richard M Lorence
(74) *Attorney, Agent, or Firm* — Harness, Dickey & Pierce, P.L.C.

(57) ABSTRACT

A power transmitting apparatus inputs or cuts off rotational power of an input member (1) to an output member (3) by press-contacting a plurality of driving-side clutch discs (6) and a plurality of driven-side clutch discs (7) with each other or releases them. A clutch housing (2) includes the driving-side clutch discs (6). A clutch member is (4) connected to the output member (3). A pressure member (5) press-contacts the discs (6) and discs (7) with each other or releases the press-contacting force between them. Application of a resisting force, for resisting relative rotation between the clutch member (4) and the pressure member (5), can be attained. A magnitude of the resisting force is set larger than a sticking torque between the discs (6) and discs (7).

3 Claims, 10 Drawing Sheets

(56) References Cited

FOREIGN PATENT DOCUMENTS

| JP | 2010-053988 A | 3/2010 |
|----|---------------|--------|
| JP | 2010-223296 A | 10/2010 |
| JP | 2013-104544 A | 5/2013 |
| JP | 2013-137039 A | 7/2013 |
| JP | 2014-126201 A | 7/2014 |

\* cited by examiner

POWER TRANSMITTING APPARATUS

CROSS-REFERENCE TO RELATED APPLICATIONS

This application is a continuation of International Application No. PCT/JP2017/002564, filed Jan. 25, 2017, which claims priority to Japanese Application No. 2016-011589, filed Jan. 25, 2016. The disclosures of the above applications are incorporating herein by reference.

FIELD

The present disclosure relates to a power transmitting apparatus that selectively transmits the rotational power of an input member to an output member or cutting-off the rotational power.

BACKGROUND

In general, the power transmitting apparatus for a motorcycle is intended to selectively perform transmission or cutting-off of the driving power of an engine to a transmission and a driving wheel. It includes an input member connected to an engine-side. An output member is connected to a transmission and a driving wheel-side. A clutch member is connected to the output member. The driving power can be transmitted by press-contacting a plurality of driving-side clutch discs and driven-side clutch discs with each other. Cut-off is by releasing the press-contacting force acting on the driving-side clutch discs and driven-side clutch discs.

More specifically, the power transmitting apparatus of the prior art includes, as disclosed in JP2010-223296 A, a clutch housing rotatable together with an input member. A plurality of driving-side clutch discs is mounted on the input member. A plurality of driven-side clutch discs is arranged alternately between the driving-side clutch discs. A clutch member is connected to an output member. A pressure member is mounted on the clutch member axially movably relative to the clutch member to press-contact the driving-side clutch discs and the driven-side clutch discs with each other. Also, it releases the press-contacting force acting on discs in accordance with axial movement relative to the clutch member. It is structured so as to transmit or cut-off the rotational power inputted to the input member to or from the output member.

In addition, another power transmitting apparatus of the prior art has been disclosed in JP2005-325993 A. This power transmitting apparatus has a press-contact assisting cam means for increasing the press-contacting force between the driving-side clutch discs and the driven-side clutch discs by an approach of the pressure member and the clutch member toward each other when the pressure member and the clutch member are relatively rotated under a condition where the rotational power inputted to the input member can be transmitted to the output member. A back-torque limiting cam means releases the press-contacting force between the driving-side clutch discs and the driven-side clutch discs due to separation of the pressure member and the clutch member caused by relative rotation of them when the rotation speed of the output member exceed that of the input member.

However, the following problems exist in the power transmitting apparatus of the prior art.

A "lever feedback" phenomenon is caused when the power transmitting apparatus is provided with both the press-contact assisting cam means and back-torque limiting cam means. Thus, a power transmitting apparatus provided only with the press-contact assisting cam means without the back-torque limiting cam means has been proposed. However, since a relatively large clearance is required between the cam surfaces or abutment surfaces of the clutch member and the pressure member, in this case due to a reason of assembly, there is a problem that abnormal noise would be caused due to interference of the abutment surfaces when a relative rotation (phase rotation) is caused between the clutch member and the pressure member by generation of the sticking torque between the driving-side clutch discs and the driven-side clutch discs when the power transmission is cut-off (clutched-off). Although such a problem is remarkable in a structure, where only the press-contact assisting cam means is installed without the back-torque limiting cam means, similar problems will be caused in structures where both the press-contact assisting cam means and the back-torque limiting cam means are installed and none of the press-contact assisting cam means and the back-torque limiting cam means is installed if the relatively large clearance is formed between the cam surfaces or abutment surfaces of the clutch member and the pressure member.

SUMMARY

It is, therefore, an object of the present disclosure to provide a power transmitting apparatus that can suppress interference between the cam surfaces or abutment surfaces of the clutch member and the pressure member even when a sticking torque would be caused between the driving-side clutch discs and the driven-side clutch discs.

To achieve the object, a power transmitting apparatus for transmitting a rotational power inputted to an input member to an output member or cutting-off the rotational power by press-contacting a plurality of driving-side clutch discs and a plurality of driven-side clutch discs with each other or releasing the press-contacting force between them comprises a clutch housing rotatable together with the input member. The driving-side clutch discs are mounted on the clutch housing. A clutch member is connected to the output member. The driven-side clutch discs are arranged alternately between the driving-side clutch discs of the clutch housing. A pressure member press-contacts the driving-side clutch discs and the driven-side clutch discs with each other or releases the press-contacting force therebetween. Application of a resisting force to resist relative rotation between the clutch member and the pressure member can be attained and the magnitude of the resisting force is set larger than a sticking torque between the driving-side clutch discs and the driven-side clutch discs.

The power transmitting apparatus further comprises clutch springs applying an urging force to press-contact the driving-side clutch discs and the driven-side clutch discs with each other. The clutch springs can also apply the resisting force.

The power transmitting apparatus resisting force can be attained by the torsional rigidity or sliding resistance of the clutch spring.

The power transmitting apparatus further comprises holding parts to cover and hold the outer surfaces of the clutch springs. The holding parts restrict torsion of the clutch springs caused by relative rotation between the clutch member and the pressure member.

The power transmitting apparatus further comprises a press-contact assisting cam means to increase the press-contacting force acting on the driving-side clutch discs and the driven-side clutch discs. This causes relative rotation of the pressure member and the clutch member and brings them close to each other when the rotational power inputted to the input member can be transmitted to the output member. A back-torque limiting cam means releases the press-contacting force acting on the driving-side clutch discs and the driven-side clutch discs. This causes relative rotation of the pressure member and the clutch member and separates them from each other when a rotational speed of the output member exceeds that of the input member.

A resisting force to resist relative rotation between the clutch member and the pressure member can be attained. The magnitude of the resisting force is set larger than a sticking torque between the driving-side clutch discs and the driven-side clutch discs. Thus, it is possible to suppress interference between the cam surfaces or abutment surfaces of the clutch member and the pressure member even when the sticking torque occurs between the driving-side clutch discs and the driven-side clutch discs.

The power transmitting apparatus further comprises clutch springs applying an urging force to press-contact the driving-side clutch discs and the driven-side clutch discs with each other. The clutch springs can also apply the resisting force. The clutch springs can perform a function of suppressing interference between the cam surfaces or abutment surfaces of the clutch member and the pressure member in addition to a function of press-contacting the driving-side clutch discs and the driven-side clutch discs with each other.

The resisting force can be attained by the torsional rigidity or sliding resistance of the clutch spring. Thus, it is possible to easily apply the resisting force against the relative rotation between the clutch member and the pressure member.

The power transmitting apparatus further comprises holding parts to cover and hold the outer surface of the clutch springs. The holding parts restrict torsion of the clutch springs caused by relative rotation between the clutch member and the pressure member. Thus, it is possible to surely apply the resisting force against the relative rotation between the clutch member and the pressure member.

The power transmitting apparatus further comprises a press-contact assisting cam means to increase the press-contacting force acting on the driving-Substitute side clutch discs and the driven-side clutch discs. This causes relative rotation of the pressure member and the clutch member and brings them closer to each other when the rotational power inputted to the input member can be transmitted to the output member. A back-torque limiting cam means to release the press-contacting force acting on the driving-side clutch discs and the driven-side clutch discs. This causes relative rotation of the pressure member and the clutch member and separates them from each other when a rotational speed of the output member exceeds that of the input member. Thus, it is possible to exhibit effects obtained by the press-contact assisting cam means or the back-torque limiting cam means. This effectively suppresses interference between the cam surfaces or abutment surfaces of the clutch member and the pressure member even when the sticking torque occurs between the driving-side clutch discs and the driven-side clutch discs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10($a$)-10($d$) is experimental data of technological advantages of the disclosed power transmitting apparatus.

DETAILED DESCRIPTION

A preferable embodiment of the present disclosure will be hereinafter described with reference to the accompanying drawings.

A power transmitting apparatus of the present embodiment is mounted on a vehicle, such as a motorcycle, to selectively transmit or cut off the driving power of an engine to a transmission or driving wheel. As shown in FIGS. 1 to 8, the power transmitting apparatus includes a clutch housing 2 connected to a gear 1 as an input member. A clutch member 4 is connected to a shaft 3 as an output member. A pressure member 5 is mounted on the clutch member 4. Driving-side clutch discs 6 are mounted on the clutch housing 2. Driven-side clutch discs 7 are mounted on the clutch member 4. A mount member 10 includes clutch springs 8. A reference character S denotes a damper.

The gear 1 can be rotated around the shaft 3 by the driving power (rotational power) transmitted from the engine and connected to the clutch housing 2 via rivets R etc. The clutch housing 2 is formed as a cylindrical casing opened at its right-hand end of FIG. 1. A plurality of driving-side clutch discs 6 are mounted on the inner circumference of the clutch housing 2. Each of the driving-Substitute side clutch discs 6 has a substantially annular plate engaging with a spline formed on the inner circumference of the clutch housing 2. Each driving-side clutch discs 6 is adapted to be rotated together with the clutch housing 2 and axially slidable (left-hand and right-hand directions seen in FIG. 1) along the spline.

Figure 3:
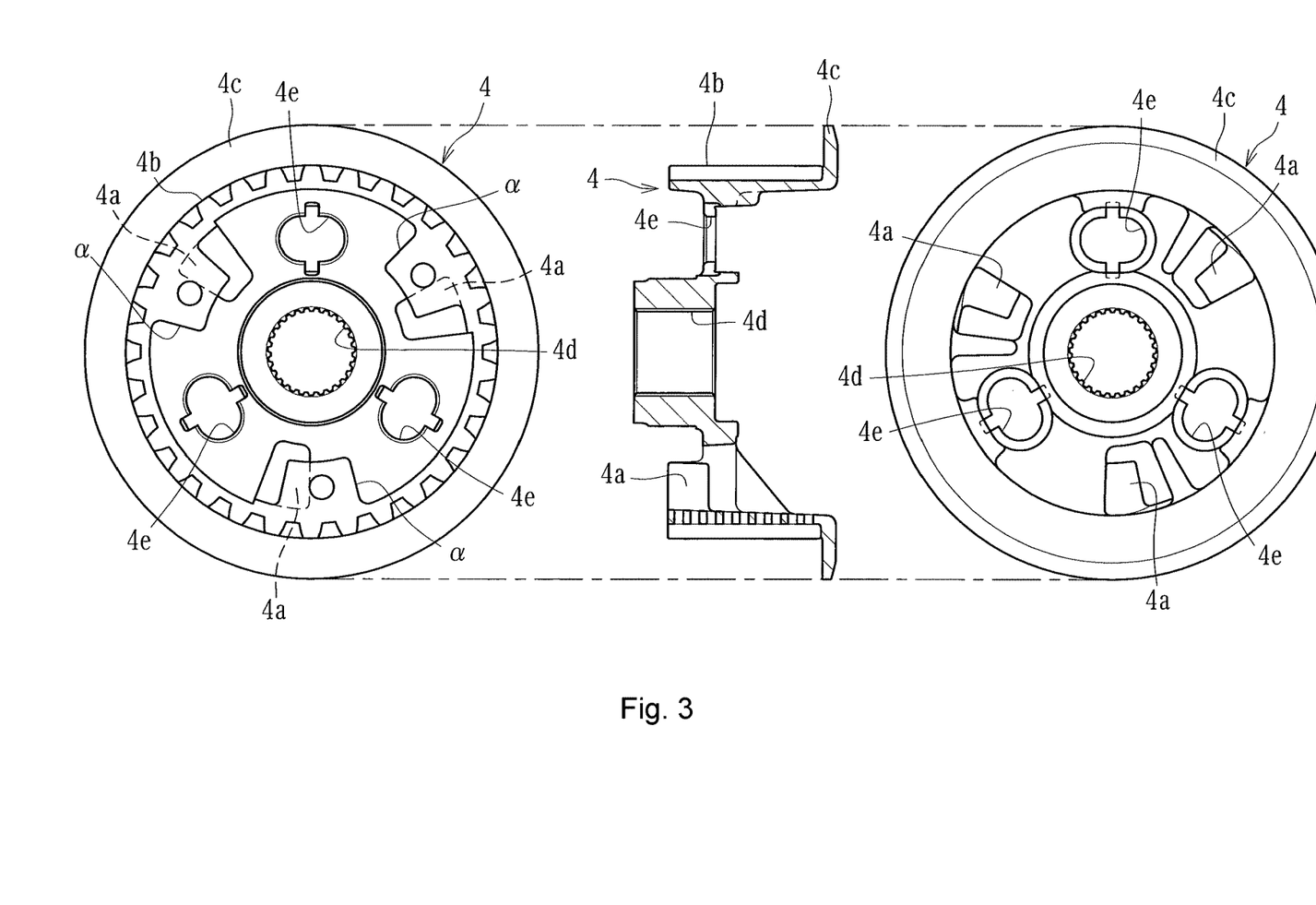
FIG. 3 is a three-aspect view of a clutch member of the power transmitting apparatus of FIG. 1.
Figure 4:
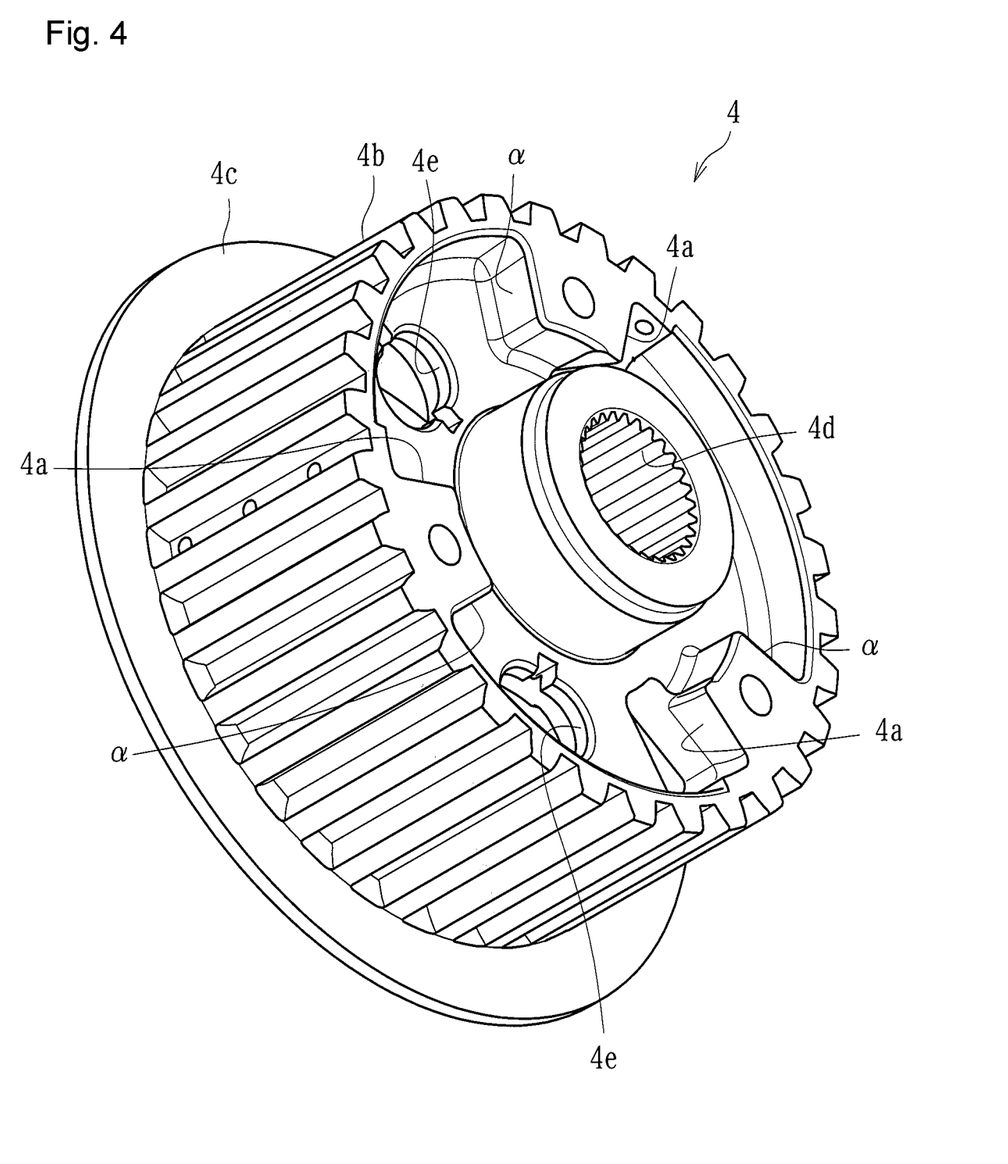
FIG. 4 is a perspective view of the clutch member of the power transmitting apparatus of FIG. 1.

The clutch member 4 is arranged within the clutch housing 2. It includes, as shown in FIGS. 3 and 4, a cam surface 4$a$ forming one part of a press-contact assisting cam described later. A spline 4$b$ is formed on the outer circumference of the clutch member 4. A flanged part 4$c$ is upstanding from one end of the clutch member 4. A central bore 4$d$ is formed at the center of the clutch member 4. Apertures 4$e$ are present through which the clutch springs 8 mounted on the pressure member 5 can be passed. The central bore 4$d$ is formed, on its inner circumference, with a spline that engages with a spline formed on the shaft 3 so as to be rotated together with the shaft 3.

The spline 4$b$ is formed on a substantially whole region of the outer circumference of the clutch member 4. The driven-side clutch discs 7 are mounted on the spline 4b, via spline engagement. This enables the driven-side clutch discs 7 to be axially moved relative to the clutch member 4 but to be prevented from being rotated relative to the clutch member 4. Thus, each driven-side clutch disc 7 is configured to rotate together with the clutch member 4. In addition, the driven-side clutch discs 7 are alternately arranged between the driving-side clutch discs 6 of the clutch housing 2. Mutually adjacent driving-side clutch discs 6 and driven-side clutch discs 7 are connected and released by press-contacting and releasing them.

The driving-side clutch discs 6 and the driven-side clutch discs 7 are alternately arranged in a laminated state between the flanged part 4c of the clutch member 4 and the flanged part 5b of the pressure member 5. The discs 6, 7 are allowed to be slid axially of the clutch member 4. Accordingly, they press-contact each other when the flanged part 4c and the flanged part 5b are moved toward each other to transmit rotational power of the clutch housing 2 to the shaft 3, via the clutch member 4. The press-contacting force is released when the flanged part 4c and the flanged part 5b are moved apart from each other to cut-off transmission of the rotational power to the shaft 3.

Figure 1:
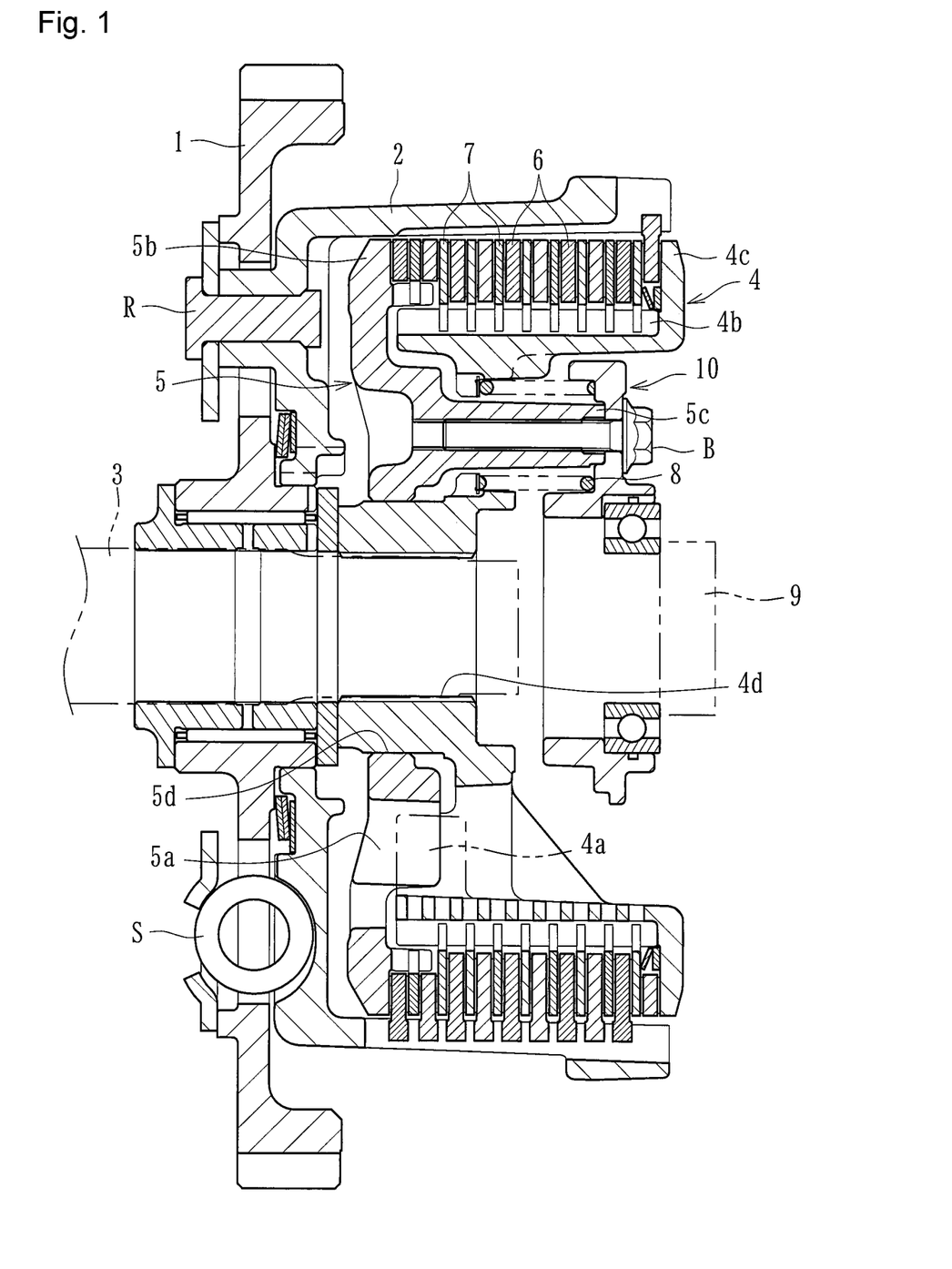
FIG. 1 is a longitudinal sectional view of a power transmitting apparatus according to an embodiment of the present disclosure.
Figure 2:
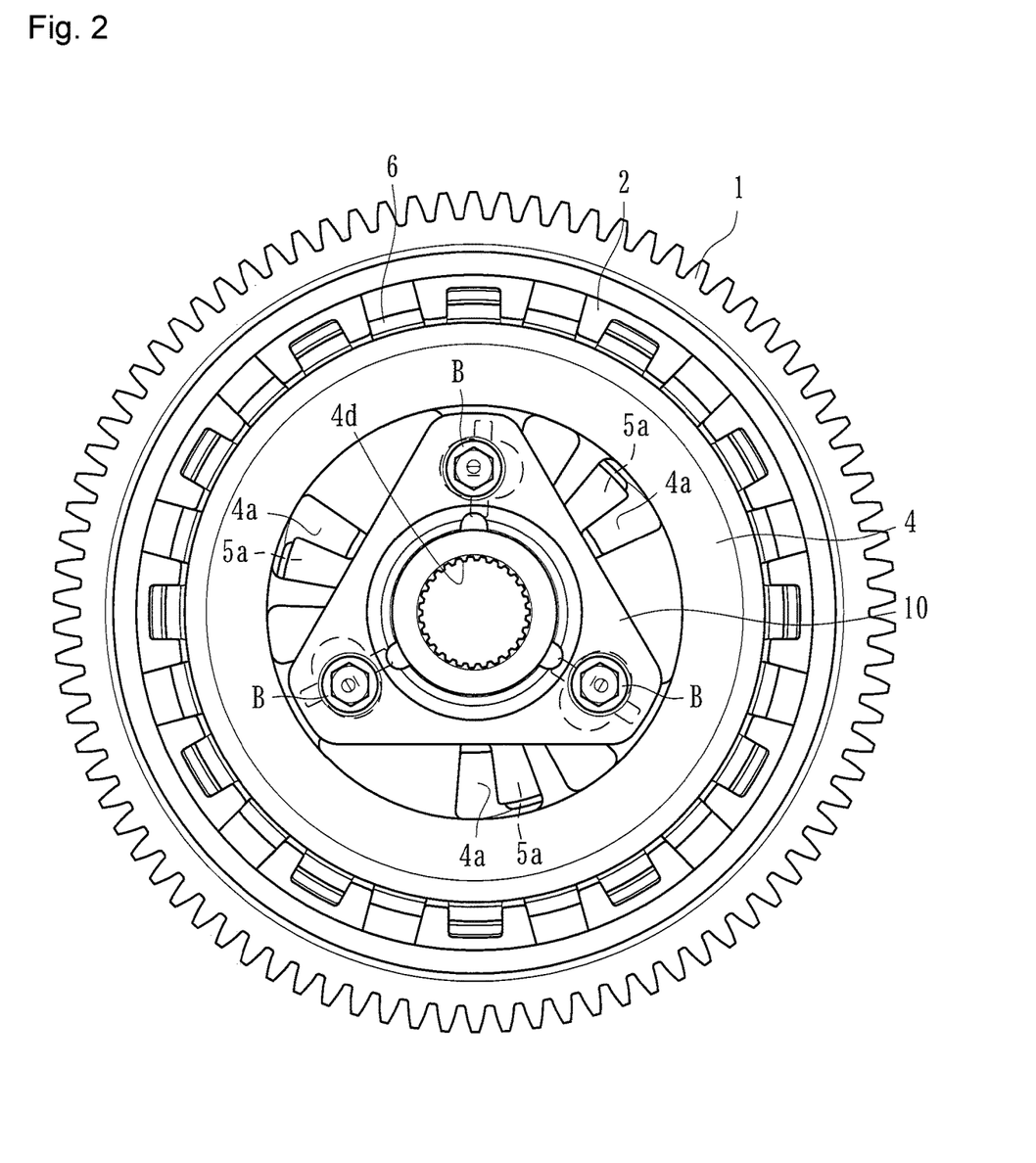
FIG. 2 is a front elevation view of the power transmitting apparatus of FIG. 1.
Figure 5:
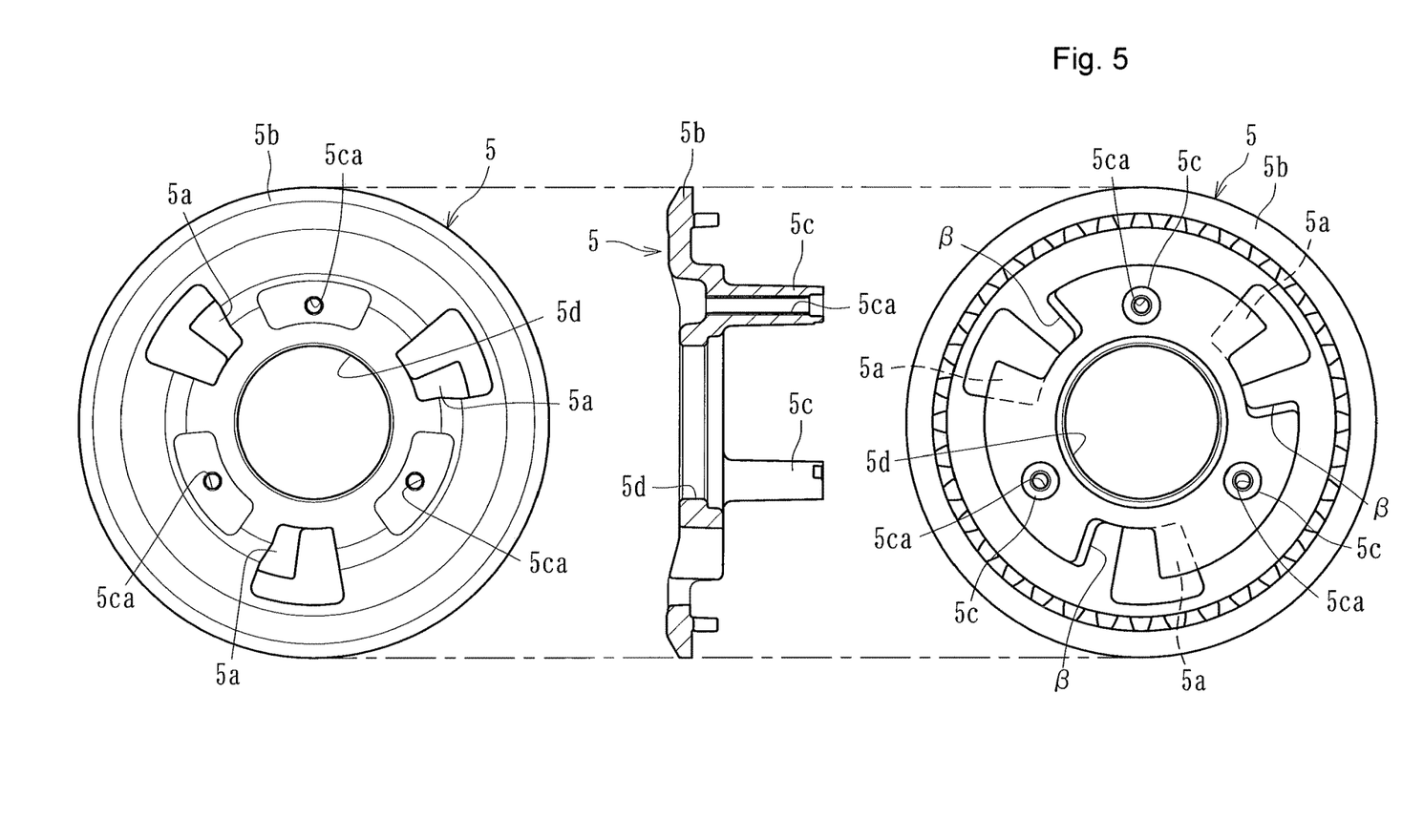
FIG. 5 is a three-aspect view of a pressure member of the power transmitting apparatus of FIG. 1.
Figure 6:
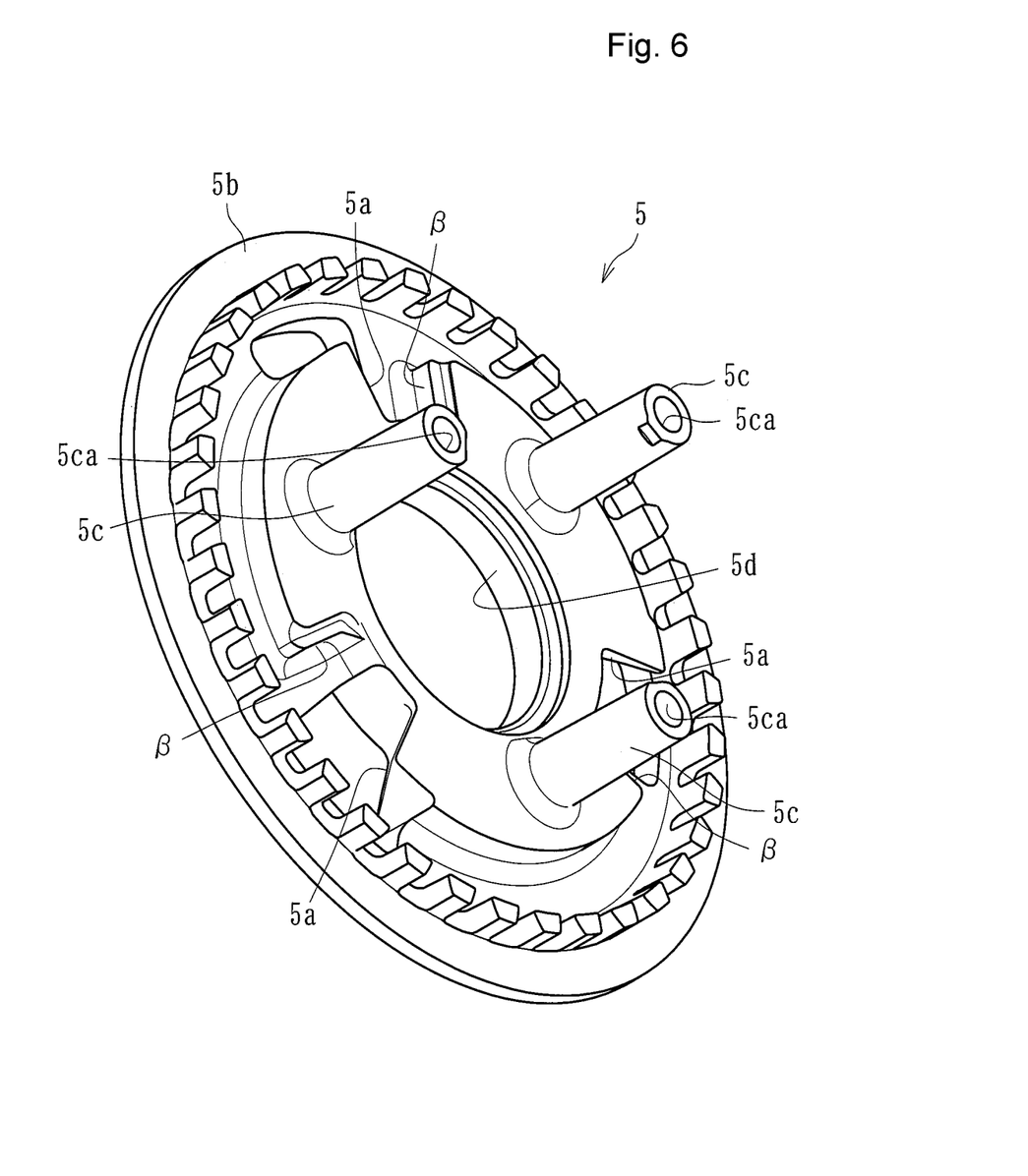
FIG. 6 is a perspective view of the pressure member of the power transmitting apparatus of FIG. 1.

The pressure member 5 is a member to be assembled to the clutch member 4. It includes, as shown in FIGS. 5 and 6, a cam surface 5a forming one part of the press-contact assisting cam means, described later. The flanged part 5b is formed on the periphery of the pressure member 5. Boss parts 5c and a central aperture 5d are formed on the pressure member. The laminated driving-side clutch discs 6 and the driven-side clutch discs 7 are positioned between the flanged part 5b of the pressure member 5 and the flanged part 4c of the clutch member 4 under an assembled state of the pressure member 5 and the clutch member 4. The clutch member 4 is passed into the central aperture 5d of the pressure member 5.

Figure 7:
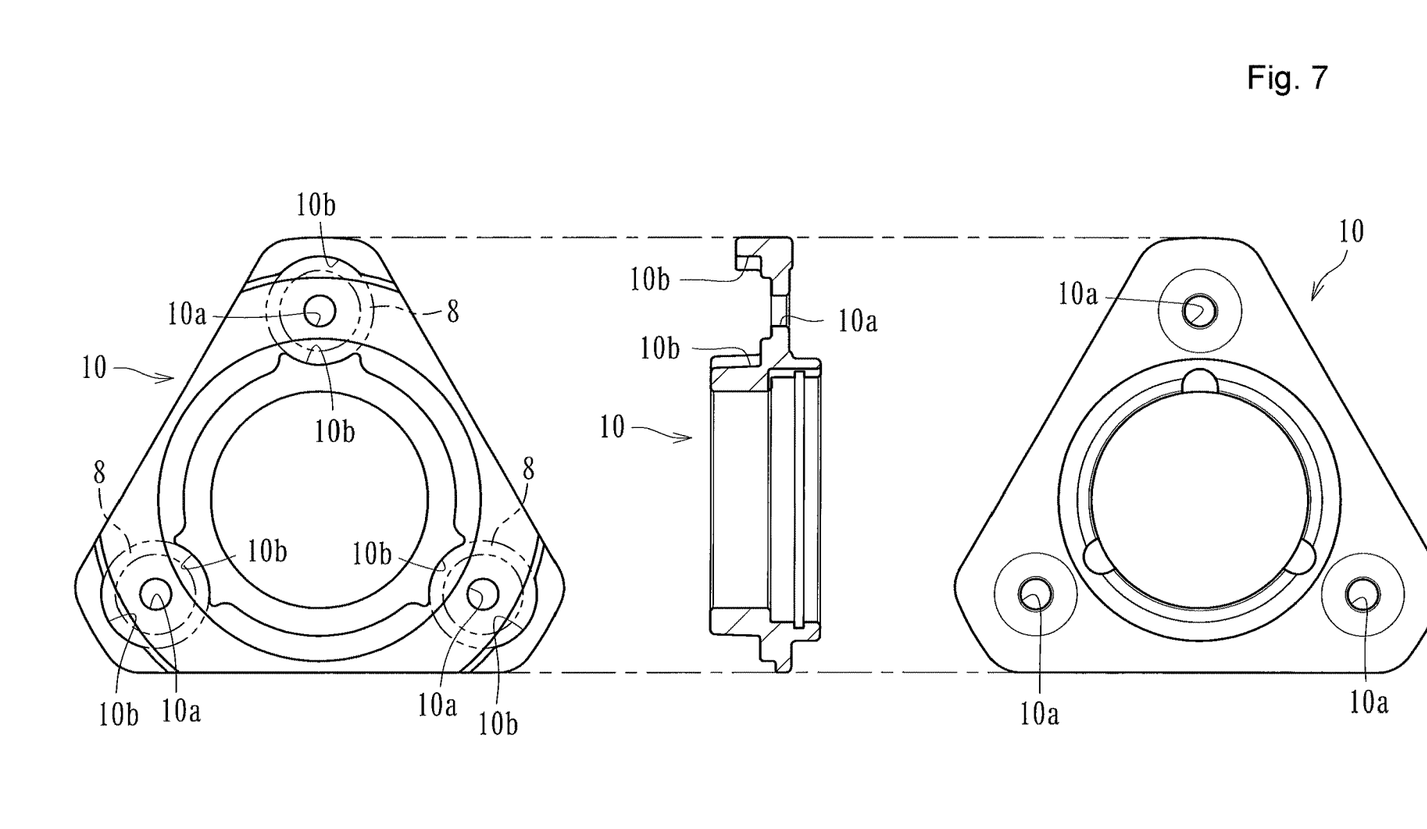
FIG. 7 is a three-aspect view of a mount member of the power transmitting apparatus of FIG. 1.
Figure 8:
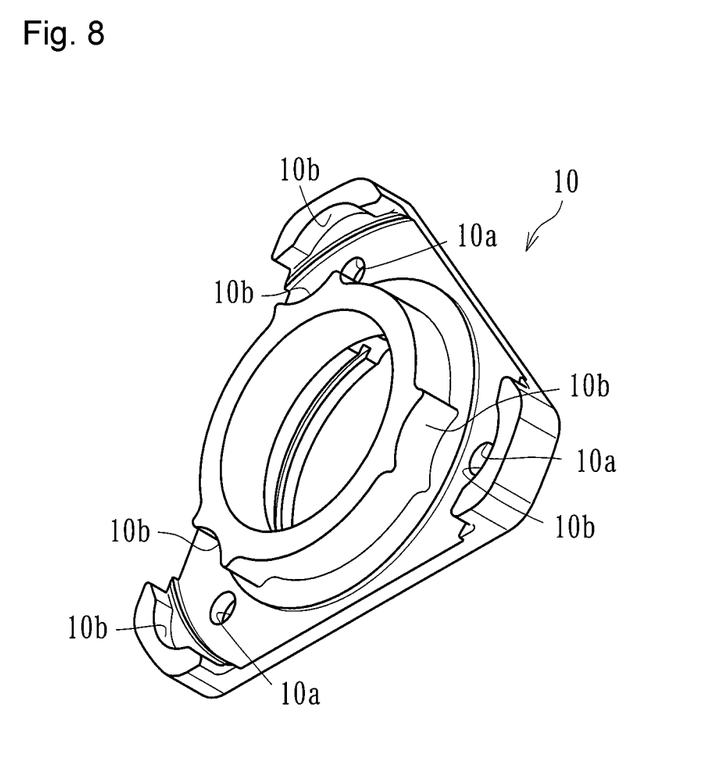
FIG. 8 is a perspective view of the mount member of the power transmitting apparatus of FIG. 1.

Each boss part 5c formed on the pressure member 5 is formed as a projected part toward the clutch member 4 (right-hand side of FIG. 1). Each boss part is formed with a mount aperture 5ca into which a clutch bolt B is screwed. The mount member 10 is mounted on the projected ends of the boss parts 5c by fastening the clutch bolts B to the mount apertures 5ca. As shown in FIG. 7, the mount member 10 is formed with apertures 10a through which the clutch bolts B are inserted. Holding parts 10b are formed around the apertures 10a to hold the outer surfaces of one ends of the clutch springs 8.

On the other hand, the other ends of the clutch springs 8 are held by any parts (circumferential parts of the apertures 4e in the present embodiment) of the clutch member 4 to apply an urging force to the clutch member 4. Thus, the clutch member 4 is normally urged toward the left in FIG. 1. An operating member 9 is connected to a bearing of the mount member 10 and accordingly the pressure member 5 can be moved to a direction (the left in FIG. 1) where the pressure member 5 is moved apart away from the clutch member 4 against the urging force of the clutch springs 8 with a driver operating an operation means such as a clutch lever (not shown).

When the pressure member 5 is moved toward the left in FIG. 1, the press-contacting force between the driving-side clutch discs 6 and the driven-side clutch discs 7 is released. Thus, transmission of the rotational power inputted to the gear 1 and clutch housing 2 to the clutch member 4 and shaft 3 is cut-off. That is, the clutch member 4 is constituted so that it can press-contact or release the driving-side clutch discs 6 and the driven-side clutch discs 7 in accordance with the axial movement of the pressure member 5.

As shown in FIGS. 3 to 6, the clutch member 4 and the pressure member 5 are formed with a cam surface 4a and a cam surface 5a. They include predetermined inclined surfaces, respectively, that are adapted to oppose each other to form a press-contact assisting cam. The press-contact assisting cam functions to increase the press-contacting force between the driving-side clutch discs 6 and the driven-side clutch discs 7 due to the approach of these clutch discs 6, 7 caused by relative rotation of the pressure member 5 and the clutch member 4 when the rotational power inputted to the clutch housing 2 (input member) can be transmitted to the shaft 3 (output member).

Figure 9:
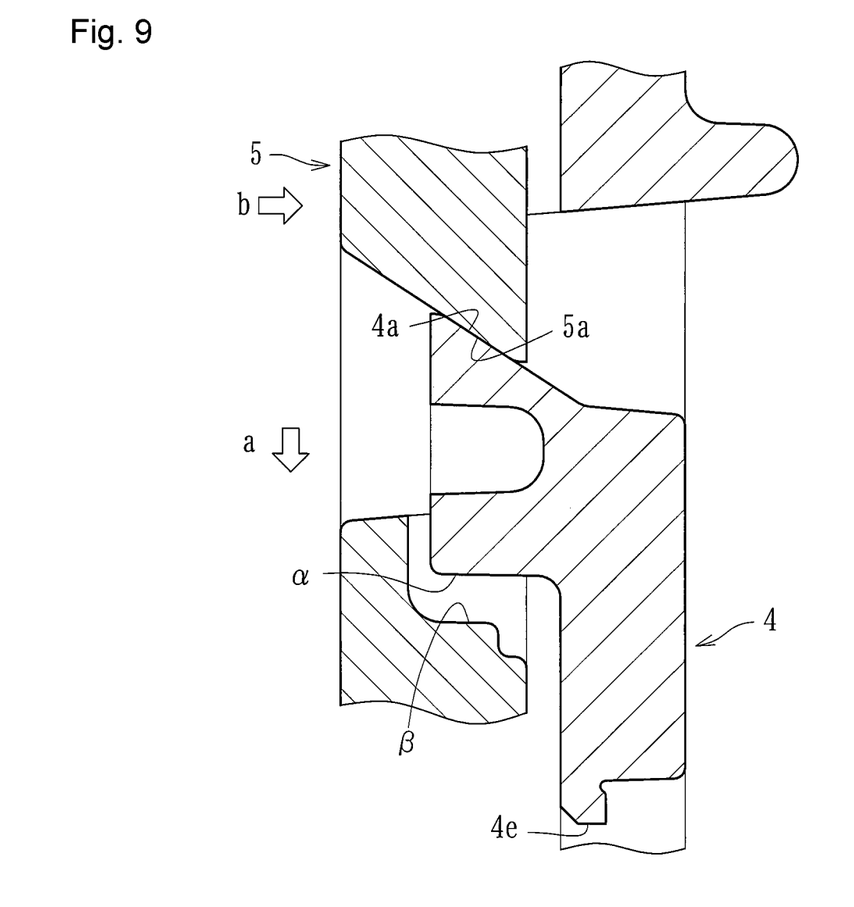
FIG. 9 is a schematic view of an action of the press-contact assisting cam means of the power transmitting apparatus of FIG. 1.
Figure 10A:
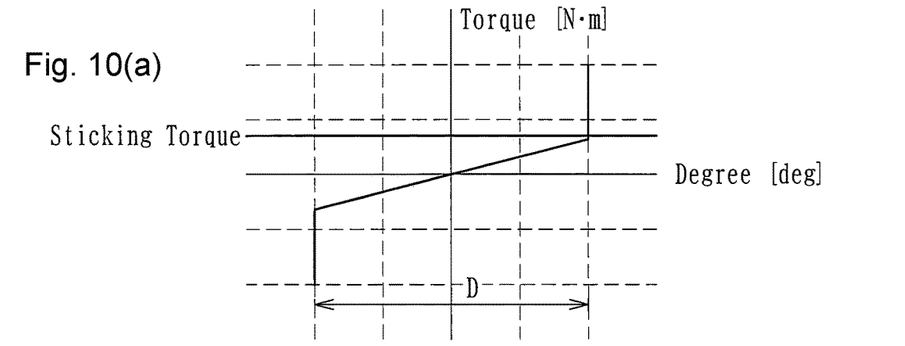
Figure 10B:
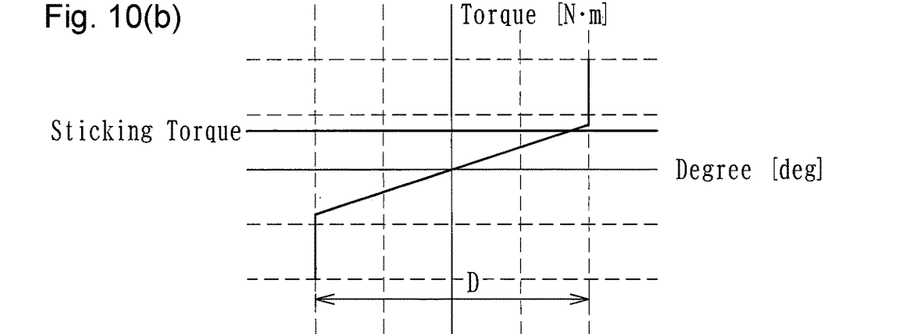
Figure 10C:
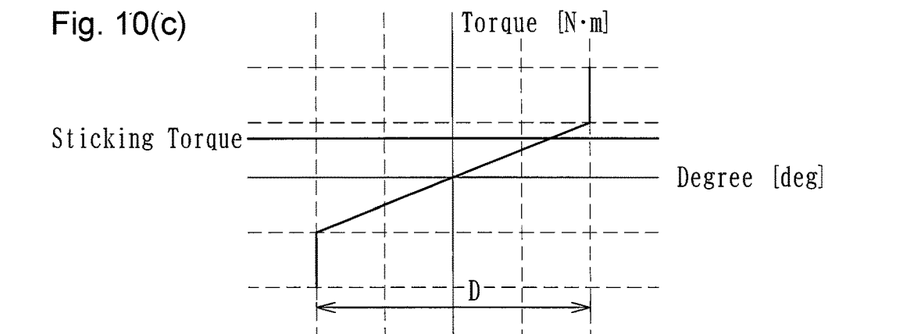
Figure 10D:
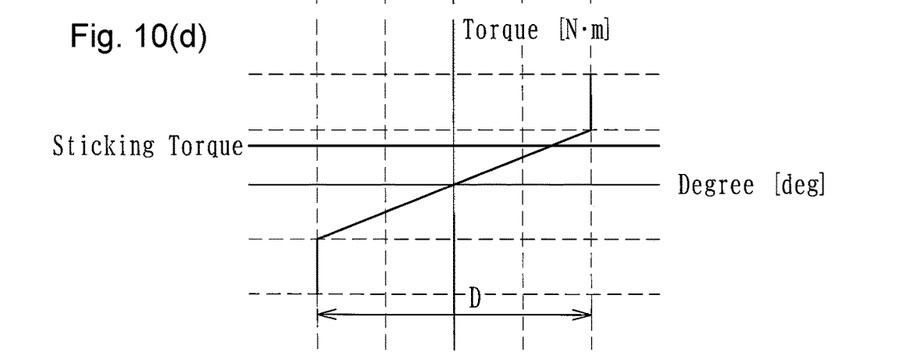

As shown in FIG. 9, the pressure member 5 rotates toward an arrow "a" direction relative to the clutch member 4 when the rotational force inputted to the clutch housing 2 (input member) is transmitted to the shaft 3 (output member). The cam surface 4a and the cam surface 5a are abutted each other. Accordingly, the pressure member 5 is moved toward an arrow "b" direction by a cam action of these cam surfaces 4a, 5a to increase the press-contacting force between the driving-side clutch discs 6 and the driven-side clutch discs 7. In the present embodiment, surfaces α, β positioned at opposite sides of the cam surfaces 4a, 5a constitute abutment surfaces.

As described later in more detail, in accordance with the present embodiment, a force resisting the relative rotation (phase rotation) between the clutch member 4 and the pressure member 5 can be obtained. The resisting force is set larger than the sticking torque between the driving-side clutch discs 6 and the driven-side clutch discs 7. The term "sticking torque", used in the present application, is defined as a torque inputted to the pressure member 5 due to transmission of power via viscosity of oil present between the driving-side clutch discs 6 and the driven-side clutch discs 7 under conditions where the vehicle is in a stopped state under a transmission gear position in the "neutral" state as well as the clutch in the "cut-off" state. A clutch member 4 and the pressure member 5 are operated to the separated state.

It is believed that the sticking torque would cause the relative rotation (phase rotation) of the pressure member 5 relative to the clutch member 4 and accordingly the cam surface 4a of the clutch member 4 would approach the cam surface 5a and cause interference. That is, when the clutch is cut-off, under a condition where the cam surface 4a and the cam surface 5a are rotated without engaging each other in the neutral state, the relative rotation (phase rotation) of the clutch member 4 and the pressure member 5 would be caused due to the difference of their inertia. Thus, the cam surface 4a and the cam surface 5a would interfer with each other as shown in FIG. 9.

More specifically, the sticking torque in the present application is a torque inputted to the pressure member 5. According to the present embodiment, the sticking torque inputted to the pressure member 5 is that generated between three clutch discs. One driven-side clutch disc 7 (leftmost clutch disc 7 in FIG. 1) fit with the pressure member 5 and two driving-side clutch discs 6 sandwiching the one driven-side clutch disc 7. In place of the illustrated embodiment, assuming that there are two driven-side clutch discs 7 fit with the pressure member 5, the sticking torque of the present application is generated between five clutch discs. The two driven-side clutch discs 7 fit with the pressure member 5 and three driving-side clutch discs 6 sandwiching and contacting with the two driven-side clutch discs 7.

As described later in more detail, according to the present embodiment, the resisting force is larger than the sticking torque generated between the clutch member 4 and the pressure member 5 under conditions where the vehicle is in a stopped state under a transmission gear positioned in the "neutral" state as well as the clutch in the "cut-off" state. The clutch member 4 and the pressure member 5 are operated to the separated state. Thus, it is possible to suppress the generation of the relative rotation (phase rotation) between the clutch member 4 and the pressure member 5. Also, it is possible to prevent the interference of the cam surface 4*a* of the clutch member 4 and the cam surface 5*a* of the pressure member 5, which is caused by approaching toward one another. Accordingly, it is possible to reduce the magnitude of abnormal noise (impact noise) caused by the interference between the cam surface 4*a* of the clutch member 4 and the cam surface 5*a* of the pressure member 5 when the clutch is operated to the cut-off state.

According to the present embodiment, the clutch springs 8 apply urging force to press-contact the driving-side clutch discs 6 and the driven-side clutch discs 7 with each other. This applies the resisting force. The resisting force is set larger than the sticking torque between the driving-side clutch discs 6 and the driven-side clutch discs 7. More specifically, the resisting force can be increased by increasing the torsional rigidity (the spring constant or the wire diameter) or the sliding resistance of the clutch springs 8 relative to their holding members.

For example as shown in FIG. 10(*a*), the sticking torque cannot be absorbed in the cam clearance D in a power transmitting apparatus of the prior art. However, according to the power transmitting apparatus of the present embodiment, the sticking torque can be absorbed in the cam clearance D when the spring constant of the clutch springs 8 is increased (FIG. 10(*b*)) and when the wire diameter of the clutch springs 8 is increased (FIG. 10(*c*)).

In addition, according to the present embodiment, the power transmitting apparatus is provided with holding parts 10*b* for covering and holding the outer surface of the clutch springs 8. The holding parts 10*b* restrict torsion of the clutch springs 8 caused by relative rotation between the clutch member 4 and the pressure member 5. That is, each holding part 10*b*, holding one end of the clutch spring 8, is formed with a wall extending axially of the clutch spring 8. It has a predetermined height to cover a portion of the outer surface of the clutch spring 8.

When the holding parts 10*b*, for holding the outer surface of the clutch springs 8, are formed according to the present embodiment, the sticking torque can be absorbed in the cam clearance D as shown in FIG. 10(*d*). The holding parts 10*b* may be arranged at other ends of the clutch springs 8 (i.e. at a clutch member 4 side).

According to the present disclosure, the application of a resisting force for resisting relative rotation between the clutch member 4 and the pressure member 5 can be attained. The magnitude of the resisting force is set larger than the sticking torque between the driving-side clutch discs 6 and the driven-side clutch discs 7. Thus, it is possible to suppress interference between the cam surfaces or abutment surfaces of the clutch member and the pressure member, cam surfaces 4*a*, 5*a* in the present embodiment, even when the sticking torque is caused between the driving-side clutch discs and the driven-side clutch discs.

In addition, the power transmitting apparatus includes the clutch springs 8 applying an urging force to press-contact the driving-side clutch discs 6 and the driven-side clutch discs 7 with each other. The clutch springs 8 can also apply the resisting force. The clutch springs 8 can perform a function of suppressing interference between the cam surfaces or abutment surfaces of the clutch member 4 and the pressure member 5, cam surfaces 4*a*, 5*a* in the present embodiment. In addition, the clutch springs 8 perform a function of press-contacting the driving-side clutch discs 6 and the driven-side clutch discs 7 with each other. Furthermore, the resisting force can also be obtained by the torsional rigidity of the clutch springs 8 or the sliding resistance of the clutch springs 8. Thus, it is possible to more easily apply the resisting force against relative rotation between the clutch member 4 and the pressure member 5.

In addition, the power transmitting apparatus includes holding parts 10*b* to cover and hold the outer surface of the clutch springs 8. The holding parts 10*b* restrict torsion of the clutch springs 8 caused by relative rotation between the clutch member 4 and the pressure member 5. Thus, it is possible to more surely apply the resisting force against the relative rotation between the clutch member 4 and the pressure member 5.

Furthermore, the power transmitting apparatus includes a press-contact assisting cam means (formed by the cam surfaces 4*a*, 5*a*) to increase the press-contacting force between the driving-side clutch discs 6 and the driven-side clutch discs 7. This is due to approaching motion caused by relative rotation of the pressure member 5 and the clutch member 4 under a state where the rotational power inputted to the input member (gear 1) can be transmitted to the output member (shaft 3). Thus, it is possible to exhibit effects obtained by the press-contact assisting cam and to effectively suppress interference between the cam surfaces or abutment surfaces of the clutch member 4 and the pressure member 5 (cam surfaces 4*a*, 5*a* in the present embodiment) even when the sticking torque is caused between the driving-side clutch discs 6 and the driven-side clutch discs 7.

In the power transmitting apparatus of the present embodiment, it may be possible to provide a back-torque limiting cam means to release the press-contacting force between the driving-side clutch discs 6 and the driven-side clutch discs 7. This is due to the separating motion caused by relative rotation of the pressure member 5 and the clutch member 4 under a state where the rotation speed of the output member (shaft 3) exceeds that of the input member (gear 1). This is in addition to or in place of the press-contact assisting cam (formed by the cam surfaces 4*a*, 5*a*). In this case, it is possible to exhibit effects obtained by the press-contact assisting cam or the back torque limiting cam. Thus, this effectively suppresses interference between the cam surfaces or abutment surfaces of the clutch member 4 and the pressure member 5 even when the sticking torque is caused between the driving-side clutch discs 6 and the driven-side clutch discs 7.

Although it has been described a preferred embodiment, the present disclosure is not limited to such an embodiment. For example, it is possible to use other separate members (e.g. rubber, frictional material, plastic or metal generating sliding resistance) than the clutch springs 8 or the holding parts 10*b* as a mechanism for applying the resisting force against relative rotation between the clutch member 4 and the pressure member 5. In addition, the present disclosure may be applied to various kinds of multiple disc clutch type power transmitting apparatus used for automobiles, three-wheeled or four-wheeled buggies or machines for general use other than motorcycles.

The present disclosure can be applied to any power transmitting apparatus having other different appearances or additional functions if the power transmitting apparatus can apply resisting force against relative rotation between the clutch member and the pressure member and the resisting force is set larger than the sticking torque between the driving-side clutch discs and the driven-side clutch discs.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmitting apparatus for transmitting a rotational power inputted from an input member to an output member or cutting-off the rotational power by press-contacting a plurality of driving-side clutch discs and a plurality of driven-side clutch discs with each other or releasing the press-contacting force comprising:
   a clutch housing rotatable together with the input member and the driving-side clutch discs mounted on the clutch housing;
   a clutch member connected to the output member, the driven-side clutch discs mounted on the clutch member, the driven-side clutch discs alternately arranged between the driving-side clutch discs of the clutch housing; and
   clutch springs applying an urging force for press-contacting the driving-side clutch discs and the driven-side clutch discs with each other releasing the press-contacting force; and
   a press-contact assisting cam for increasing the press-contacting force acting on the driving-side clutch discs and the driven-side clutch discs by causing relative rotation of a pressure member and the clutch member and bring them close to each other when the rotational power inputted to the input member is transmitted to the output member;
   the clutch springs applying a resisting force for resisting relative rotation between the clutch member and the pressure member when the clutch member and pressure member are operated to a separated state and a magnitude of the resisting force is set larger than a sticking torque between the driving-side clutch discs and the driven-side clutch discs.

2. The power transmitting apparatus of claim 1, wherein the resisting force is attained by the torsional rigidity or sliding resistance of the clutch springs.

3. The power transmitting apparatus of claim 1, further comprising the at least one holding part covering and holding an outer surface of the clutch springs and wherein the at least one holding part restricts torsion of the clutch springs caused by the relative rotation between the clutch member and the pressure member.

* * * * *

UNITED STATES PATENT AND TRADEMARK OFFICE
CERTIFICATE OF CORRECTION

PATENT NO. : 10,781,865 B2
APPLICATION NO. : 16/044573
DATED : September 22, 2020
INVENTOR(S) : Kenichiro Isobe et al.

Page 1 of 1

It is certified that error appears in the above-identified patent and that said Letters Patent is hereby corrected as shown below:

In the Specification

<u>Column 3</u>
Line 39         "driving-Substitute side" should be –driving-side–

<u>Column 4</u>
Line 47         "driving-Substitute side" should be –driving-side–

Signed and Sealed this
Fifth Day of January, 2021

Andrei Iancu
*Director of the United States Patent and Trademark Office*